(12) United States Patent
Haug et al.

(10) Patent No.: US 11,786,989 B2
(45) Date of Patent: Oct. 17, 2023

(54) METHOD FOR SPLASH-FREE WELDING, IN PARTICULAR USING A SOLID-STATE LASER

(71) Applicant: TRUMPF Laser- und Systemtechnik GmbH, Ditzingen (DE)

(72) Inventors: Patrick Haug, Gerlingen (DE); Nicolai Speker, Pleidelsheim (DE); Marco Opitz, Leonberg (DE); Tim Hesse, Ditzingen (DE)

(73) Assignee: TRUMPF LASER- UND SYSTEMTECHNIK GMBH, Ditzingen (DE)

( * ) Notice: Subject to any disclaimer, the term of this patent is extended or adjusted under 35 U.S.C. 154(b) by 224 days.

(21) Appl. No.: 17/317,925

(22) Filed: May 12, 2021

(65) Prior Publication Data

US 2021/0260690 A1    Aug. 26, 2021

Related U.S. Application Data

(63) Continuation of application No. PCT/EP2019/080878, filed on Nov. 11, 2019.

(30) Foreign Application Priority Data

Nov. 12, 2018  (DE) ...................... 10 2018 219 280.4

(51) Int. Cl.
*B23K 26/035* (2014.01)
*B23K 26/244* (2014.01)
(Continued)

(52) U.S. Cl.
CPC ........ *B23K 26/035* (2015.10); *B23K 26/0613* (2013.01); *B23K 26/244* (2015.10); *B23K 26/32* (2013.01)

(58) Field of Classification Search
CPC .............. B23K 26/073; B23K 26/0604; B23K 26/0608; B23K 26/035; B23K 26/0613
See application file for complete search history.

(56) References Cited

U.S. PATENT DOCUMENTS

| 6,444,947 B1 | 9/2002 | Beyer et al. |
| 2006/0157457 A1 | 7/2006 | Sakurai et al. |
| (Continued) | | |

FOREIGN PATENT DOCUMENTS

| CN | 1307510 A | 8/2001 |
| CN | 1785575 A | 6/2006 |
| (Continued) | | |

OTHER PUBLICATIONS

Blockley, et al., *Encyclopedia of Aerospace Engineering*, pp. 144-147, Nov. 15, 2010, John Wiley & Sons Inc., Oak Brook, IL, USA.
(Continued)

*Primary Examiner* — Thien S Tran
(74) *Attorney, Agent, or Firm* — LEYDIG, VOIT & MAYER, LTD.

(57) ABSTRACT

Laser beam welding a workpiece includes: generating first and second beam areas on the workpiece by first and second laser beams, respectively. The beam areas are guided in a feed direction relative to the workpiece. Centroids of the beam areas are not coinciding. The first beam area runs ahead of the second beam area. A length of the first beam area, measured transversely to the feed direction, is greater than or equal to that of the second. A surface area of the first beam area is greater than that of the second. A width of the first beam area, measured in the feed direction, is greater than or equal to that of the second. A laser power of the first laser beam is greater than that of the second. The second laser beam is irradiated into a weld pool generated by the first laser beam.

17 Claims, 5 Drawing Sheets

(51) Int. Cl.
*B23K 26/06* (2014.01)
*B23K 26/32* (2014.01)

(56) References Cited

U.S. PATENT DOCUMENTS

| | | | |
|---|---|---|---|
| 2012/0000892 A1* | 1/2012 | Nowak | B23K 26/26 |
| | | | 219/121.64 |
| 2014/0076865 A1 | 3/2014 | Yano et al. | |
| 2014/0124481 A1 | 5/2014 | Yano et al. | |
| 2016/0368089 A1 | 12/2016 | Grapov et al. | |
| 2017/0368638 A1 | 12/2017 | Chann et al. | |
| 2018/0065207 A1 | 3/2018 | Hammer et al. | |
| 2018/0217408 A1 | 8/2018 | Farrow et al. | |
| 2019/0262942 A1 | 8/2019 | Haug et al. | |
| 2019/0389001 A1 | 12/2019 | Kayahara et al. | |
| 2021/0260690 A1 | 8/2021 | Haug et al. | |

FOREIGN PATENT DOCUMENTS

| | | | |
|---|---|---|---|
| CN | 102310289 A | | 1/2012 |
| CN | 102476242 A | | 5/2012 |
| CN | 103476536 A | | 12/2013 |
| CN | 107953032 A | | 4/2018 |
| DE | 10261422 A1 | | 7/2004 |
| DE | 102011016579 A1 | | 11/2011 |
| DE | 102015207279 A1 | | 10/2016 |
| DE | 102015112537 A1 | | 1/2017 |
| DE | 102016105214 A1 | | 9/2017 |
| DE | 102016218938 A1 | | 4/2018 |
| DE | 102016222357 A1 | | 5/2018 |
| DE | 102018219280 A1 | | 5/2020 |
| EP | 1052052 A1 | | 11/2000 |
| EP | 1007267 B1 | | 3/2006 |
| GB | 2354196 A | | 3/2001 |
| JP | 2002160083 A | | 6/2002 |
| JP | 2002219590 A | * | 8/2002 |
| JP | 2002219590 A | | 8/2002 |
| JP | 2004154813 A | | 6/2004 |
| JP | 2004358521 A | | 12/2004 |
| JP | 2009178768 A | | 8/2009 |
| JP | 2010240734 A | | 10/2010 |
| JP | 2012110905 A | * | 6/2012 |
| JP | 2015205327 A | | 11/2015 |
| JP | 2015205327 A | * | 11/2015 |
| WO | 2010119173 A1 | | 10/2010 |
| WO | WO 2012132024 A1 | | 10/2012 |
| WO | WO 2018011456 A1 | | 1/2018 |
| WO | WO 2018054850 A1 | | 3/2018 |
| WO | WO 2018099851 A1 | | 6/2018 |
| WO | 2018159857 A1 | | 9/2018 |

OTHER PUBLICATIONS

Liu Zongchang et al., "Introduction to metal materials engineering," 2$^{nd}$ Edition, Jan. 2018, pp. 66-67, Tan Xueyu, Beijing, China.

* cited by examiner

METHOD FOR SPLASH-FREE WELDING, IN PARTICULAR USING A SOLID-STATE LASER

CROSS-REFERENCE TO PRIOR APPLICATIONS

This application is a continuation of International Patent Application No. PCT/EP2019/080878, filed on Nov. 11, 2019, which claims priority to German Patent Application No. DE 10 2018 219 280.4, filed on Nov. 12, 2018. The entire disclosure of both applications is hereby incorporated by reference herein.

FIELD

The invention relates to a method for laser beam welding a workpiece.

BACKGROUND

Laser beam welding is used when components are to be welded at high welding speeds, with narrow and thin weld seams and with little thermal distortion. The laser beam creates a liquid weld pool in the region of a joint between the workpiece portions to be joined. After the weld pool has solidified, the components are rigidly connected to one another. Common laser types for laser beam welding are, in particular, $CO_2$ lasers and solid-state and diode lasers.

The laser beam welding of metals typically takes place as deep penetration welding. In laser beam deep penetration welding, the relative movement between the laser beam and the workpiece moves a vapor capillary (keyhole) through the liquid weld pool. If the feed speed is too high, a large amount of weld spatter is produced and the quality of the weld seam is reduced due to the formation of notches. In principle, the melt flow dynamics increase with increasing energy absorbed, and when critical values are reached, the above-mentioned negative effects occur, which cause a loss of mass of the seam, and/or pronounced cyclical melt flow behavior.

If a laser beam from a solid-state laser having a high brilliance and a small focus diameter is used, the limit for a low-spatter weld seam quality is shifted to lower feed speeds due to the increased power density compared with $CO_2$ lasers. The melt flow rate and the weld pool dynamics (turbulence) are increased, which leads to increased weld seam defects.

$CO_2$ lasers are usually used for full penetration welding processes, for example in the butt joint, in which a weld seam is produced that extends over the entire thickness of the workpiece. However, it would be desirable to replace the $CO_2$ lasers with solid-state lasers in order to achieve savings in energy costs.

For partial penetration welds in lap joints, it has been shown that a coaxial superimposition of a first laser beam having a larger focus diameter with a second laser beam having a smaller focus diameter can significantly reduce the formation of spatter ejected upward from the weld pool; cf. DE 10 2016 222 357 A1 or WO 2018/011456 A1.

When experimenting with the use of this method for deep or full penetration welds, however, the inventors observed that the small diameter of the second beam (core beam) leads to spatters on the bottom side of the seam; and therefore, this method is not suitable for high-quality full penetration welds on the top side and bottom side of the seam.

Various other methods have been proposed in the prior art to influence the weld pool dynamics.

DE 102 61 422 A1 discloses a laser welding and soldering method in which the laser beam is divided into at least two separately focusable partial beams and in which the distribution of the intensity and the point of incidence of the partial laser beams can be adjusted by a variable optical arrangement.

EP 1 007 267 B1, JP 2004 358 521 A and JP 2004 154 813 A disclose laser welding methods in which different laser beams or partial beams of a laser beam are focused on the workpiece in such a way that their focal points are arranged so as to be offset relative to one another within the workpiece in the direction of beam propagation. The beam axes of the laser beams or partial beams can be arranged so as to be offset relative to one another, that is to say so as to be non-concentric with one another.

DE 10 2015 207 279 A1 discloses a laser welding method in which a multicore fiber having parallel adjacent fiber cores of different diameters is used as a transport fiber for the laser beam, such that two smaller focus areas (secondary spots) with lower laser power running in front of a larger focus area (main spot) are formed on the workpiece surface.

DE 10 2015 112 537 A1 discloses a laser welding method in which a round or square main spot and, running transversely in front, a linear focus or two secondary spots with a smaller extent are formed on the workpiece. The distribution of the laser power between the main spot and the secondary spots can be adjusted by moving a beam-shaping optical module.

A leading linear focus, which can be composed of a plurality of circular secondary spots arranged one next to the other is disclosed in DE 10 2016 218 938 A1.

A leading arcuate spot is disclosed in US 2017 0368638 A1 and US 2018 0217408 A1.

WO 2018 099 851 A1 and DE 10 2016 105 214 A1 disclose producing a main spot and two secondary spots for welding or soldering by means of diffractive or refractive optical elements. WO 2018 054 850 A1 discloses performing beam shaping to generate a desired energy distribution in the focus area by means of scanner optics.

SUMMARY

In an embodiment, the present invention provides a method for laser beam welding a workpiece that includes: generating at least a first beam area on the workpiece by a first laser beam; and generating a second beam area on the workpiece by a second laser beam. The first beam area and the second beam area are guided in a feed direction relative to the workpiece. Centroids of the first beam area and the second beam area are not coinciding. The first beam area runs ahead of the second beam area. A length (LE1) of the first beam area, measured transversely to the feed direction, is greater than or equal to a length (LE2) of the second beam area. A surface area of the first beam area is greater than a surface area of the second beam area. A width (BE1) of the first beam area, measured in the feed direction, is greater than or equal to a width (BE2) of the second beam area. A laser power of the first laser beam is greater than a laser power of the second laser beam. The second laser beam is irradiated into a weld pool generated by the first laser beam.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Embodiments of the present invention provide a welding method by means of which workpieces can be welded over their full workpiece thickness at a high feed speed and with a good seam quality.

An embodiment according to the present invention provides a method for laser beam welding a workpiece. The method includes at least a first beam area being generated on the workpiece by a first laser beam and a second beam area being generated on the workpiece by a second laser beam and said beam areas being guided in a feed direction relative to the workpiece. The centroids of the first beam area and the second beam area do not coincide and the first beam area runs ahead of the second beam area. A length LE1 of the first beam area, measured transversely to the feed direction, is greater than or equal to the length LE2 of the second beam area. The surface area of the first beam area is greater than the surface area of the second beam area, a width $BE_1$ of the first beam area, measured in the feed direction, is greater than or equal to a width $BE_2$ of the second beam area, a laser power of the first laser beam is greater than a laser power of the second laser beam, and the second laser beam is irradiated into a weld pool generated by the first laser beam.

The first laser beam and the second laser beam can be generated independently of one another, or they can also be generated by splitting a common original laser beam (splitting the original laser beam into partial beams).

An embodiment of the present invention creates a leading, larger first beam area (leading spot) and a trailing, smaller second beam area (trailing spot) on the workpiece, the centers (centroids) of which beam areas do not coincide, the length (transverse to the feed direction) and the width (in the feed direction) of the leading spot being at least as large as the diameter or the corresponding dimension of the trailing spot, and the laser power of the leading laser beam being higher than the laser power of the trailing laser beam.

The inventors have recognized that, for a good quality of the top and bottom sides of the seam with a simultaneously high feed rate, the leading spot preferably initiates the formation of a weld pool with a sufficiently large diameter or a sufficiently large area (in and transversely to the feed direction). The leading beam preferably also has a sufficiently high laser power in order to produce a cohesive melt film on the workpiece surface. The second beam is focused into the weld pool formed in this way.

Within the scope of the invention, the energy input into the workpiece or into the workpiece portions to be welded can be kept low, and low weld pool dynamics can be achieved. In particular, the formation of spatter on the bottom side of the seam can be minimized.

In this way, the method according to embodiments of the invention can be implemented as deeply reaching partial penetration welding or as full penetration welding, i.e. the workpiece is melted down to the underside of the workpiece during the welding process. The method takes place in the deep penetration welding regime, i.e. a vapor capillary (keyhole) is created in the weld pool. The laser beams preferably do not emerge from the workpiece on the underside of the workpiece, but rather the vapor capillary (keyhole) remains closed on the underside of the workpiece.

When guiding the laser beams relative to the workpiece, the laser beams and/or the workpiece can be moved.

The first beam area is typically in the shape of a rectangle or circular ring segment, or is composed of a plurality of partial beam areas, which are typically in the shape of a rectangle or circular ring segment. If the first beam area is composed of separate partial beam areas, the conditions according to the invention for the first beam area apply to the entirety (sum) of the partial beam areas. The second beam area is typically circular or square. The first beam area and the second beam area are typically both arranged so as to be mirror-symmetrical with respect to a plane that contains the feed direction.

The first beam area is considered to be running ahead/leading in relation to the second beam area if the centroid of the first beam area lies in front of the centroid of the second beam area with respect to the feed direction; within the scope of the invention, the two beam areas can be arranged so as to completely or partially overlap or preferably so as to be separate from one another (not overlapping).

The beam divergence of the first laser beam and the beam divergence of the second laser beam are preferably the same or the beam divergence of the second laser beam is smaller than the beam divergence of the first laser beam. This contributes to the energy of the second beam only being absorbed in the lower zone of the vapor capillary.

Preferably, $LE_1 \geq 1.5 * LE_2$ and particularly preferably $LE_1 \geq 2 * LE_2$ applies to the lengths of the beam areas, and $BE_1 \geq 1.5 * BE_2$ preferably applies to the widths of the beam areas ($LE_1$ being a length of the first beam area, $LE_2$ being a length of the second beam area, $BE_1$ being a width of the first beam area, and $BE_2$ being a width of the second beam area). Preferably, $LL_1 \geq 1.2*LL_2$ and particularly preferably $LL_1 \geq 1.5*LL_2$ applies to the laser power $LL_1$ (possibly totaled over all partial beam areas) of the first laser beam and the laser power $LL_2$ of the second laser beam. Preferably, $FI_1 \geq 2*FI_2$, particularly preferably $FI_1 \geq 3*FI_2$, and most preferably $FI_1 \geq 5*FI_2$, applies to the (possibly totaled) surface area $FI_1$ of the first beam area and the surface area $FI_2$ of the second beam area.

The method according to embodiments of the invention can in particular be used to manufacture a workpiece having a butt joint between the workpiece portions to be welded. In particular, tubes, profiles and tailored welded blanks can be manufactured without subsequent machining work. Very good seam qualities have resulted, in particular, for workpieces having a thickness of between 0.5 mm and 3 mm.

In a preferred variant of the method according to the invention, the laser beams are generated using one or more solid-state lasers. Solid-state lasers allow for the generation of laser beams with a comparatively high level of brilliance and a small focus diameter, which generally increases the tendency for spatter to form on the top and bottom side of the seam, and weld seam defects in general become more frequent. Within the scope of the method according to the invention, even when using solid-state lasers, good seam qualities can be utilized at high feed speeds in full penetration welding.

In another preferred variant, a focus diameter $FD_2$ of the second laser beam is smaller than a focus diameter $FD_1$ of the first laser beam and a power density of the second laser beam is greater than a power density of the first laser beam. This power density distribution has proven to be favorable for the seam quality. In the region of the second laser beam, the vapor capillary penetrates deeper into the workpiece and can cause the workpiece material to melt down to the underside of the workpiece. In general, the first and second laser beams are typically focused on the workpiece surface; however, a focus position below the workpiece surface can also be selected, for example.

In a particularly preferred variant, the following applies to a focus diameter $FD_2$ of the second laser beam at least in one direction transverse to the feed direction:

$$FD_2 \geq d_{Min}, \text{ with } d_{Min} = \sqrt{\frac{k_{d,Min} \cdot s}{v}},$$

with $k_{d,Min}$: a material-specific constant between 3 and 30 mm²/s, with s: workpiece thickness to be welded, and with v: feed speed for the laser beam welding. If this condition is met, the spatter tendency on the bottom side of the seam is particularly low. The thicker the workpiece, the larger the focus diameter $FD_2$ of the second laser beam that should be selected (at least). The higher the feed speed v, the smaller the focus diameter $FD_2$ that can be selected. For structural steel, $k_{d,Min}$ is between 8 and 20 mm²/s, for stainless steel between 5 and 20 mm²/s. If the second laser beam is circular at the focus, the above condition applies in general; if the laser beam is intended to have different diameters in different directions, the above condition applies to $FD_2$ for the diameter of the second laser beam transversely to the feed direction. The diameter $d_{Min}$ can be undershot in the feed direction.

In an advantageous development of this variant, the following applies to the length $LE_1$ of the first beam area:

$$LE_1 \geq b_{Min}, \text{ with } b_{Min} = 2*d_{Min}.$$

This makes it possible to further improve the seam quality. The thicker the workpiece, the greater the length $LE_1$ that should be selected (at least). The higher the feed speed v, the smaller the length $LE_1$ that can be selected. If the first beam area comprises separate partial beam areas, the length $LE_1$ is determined between the edges of the partial beam areas that are furthest apart in the direction transverse to the feed direction.

In another advantageous development of the above variant, the following applies to a distance a between the centroids of the first beam area and the second beam area in the feed direction:

$$a \geq a_{Min}, \text{ with } a_{Min} = 2*d_{Min}.$$

The seam quality can also be further improved in this way. The thicker the workpiece, the larger the distance a that should be selected (at least). The higher the feed speed v, the smaller the distance a that can be selected. If the first beam area comprises separate partial beam areas, the centroid of the first beam area is determined for the entirety of the partial beam areas.

In a preferred variant, a plurality of workpieces of different workpiece thicknesses are subjected to the laser beam welding, and a distance a between the centroids of the first beam area and the second beam area in the feed direction is selected so as to be greater for workpieces having a greater workpiece thickness. This procedure makes it possible to adapt to the different workpieces or their workpiece thicknesses, as a result of which an optimized seam quality and feed speed can be achieved.

In a variant of the method, the first beam area and the second beam area overlap.

In an alternative variant, the first beam area and the second beam area are separated from one another. Due to the spatial distance between the first laser beam and the second laser beam, heat conduction and melting processes can progress in the workpiece from when the first laser beam acts to when the second laser beam acts, as a result of which the conditions in the workpiece can be optimized for the action of the second laser beam. In addition, lower weld pool dynamics are usually achieved, in particular because the power densities of the two lasers do not add up anywhere and thus local power density peaks are reduced.

In a particularly preferred variant, the first beam area comprises at least two partial beam areas lined up in a direction transverse to the feed direction and separated from one another, said partial beam areas in particular being circular. The generation of a first beam area extending transversely to the feed direction is particularly simple using lined-up partial beam areas, for example by means of an array generator from a single laser beam. The partial beam areas lined up transversely to the feed direction are preferably arranged so as to be symmetrical to the second beam area.

In an advantageous variant, the first beam area comprises at least two partial beam areas lined up in the feed direction and separated from one another, said partial beam areas in particular being in the shape of a rectangle or circular ring segment. By using partial beam areas lined up in the feed direction, the energy input and the weld pool formation can be set in a targeted manner in front of the second laser beam, in particular taking into account the workpiece thickness. Typically, all partial beam areas of the first beam area lined up in the feed direction are arranged in front of the second partial beam area with respect to the feed direction.

In a preferred development of this variant, $FD_2 \geq d_{Min}$ applies to the focus diameter $FD_2$ of the second beam area in the at least one direction transverse to the feed direction and, furthermore, for a distance a' between the centroids of the foremost partial beam area of the first beam area and the second beam area in the feed direction, the following applies:

$$a' \geq a_{Min}, \text{ with } a_{Min} = 2 * d_{Min}.$$

This in turn makes it possible to achieve a particularly good seam quality. The thicker the workpiece, the larger the distance a' that should be selected (at least). The higher the feed speed, the smaller the distance a' that can be selected.

In a preferred development of the above variant, a plurality of workpieces of different workpiece thicknesses are subjected to the laser beam welding, and a number NV of partial beam areas lined up in the feed direction is selected so as to be larger with a larger workpiece thickness. This procedure makes it possible to adapt to the different workpieces or their workpiece thicknesses, as a result of which an optimized seam quality and feed speed can be achieved.

In a preferred variant, the laser beam welding is implemented as full penetration welding. The workpiece is melted down to the underside of the workpiece during the welding process. The laser beams preferably do not emerge from the workpiece on the underside of the workpiece, but rather the vapor capillary (keyhole) remains closed on the underside of the workpiece. Within the scope of the invention, spatter formation on the underside of the workpiece can be minimized and a high seam quality can be achieved.

Further advantages of the invention can be found in the description and the drawings. Likewise, according to the invention, the aforementioned features and those which are to be explained below can each be used individually for themselves or for a plurality of combinations of any kind. The embodiments shown and described are not to be understood as an exhaustive enumeration but rather have exemplary character for the description of the invention.

The invention is represented schematically in the drawings and is explained in more detail using embodiments.

Figure 1:
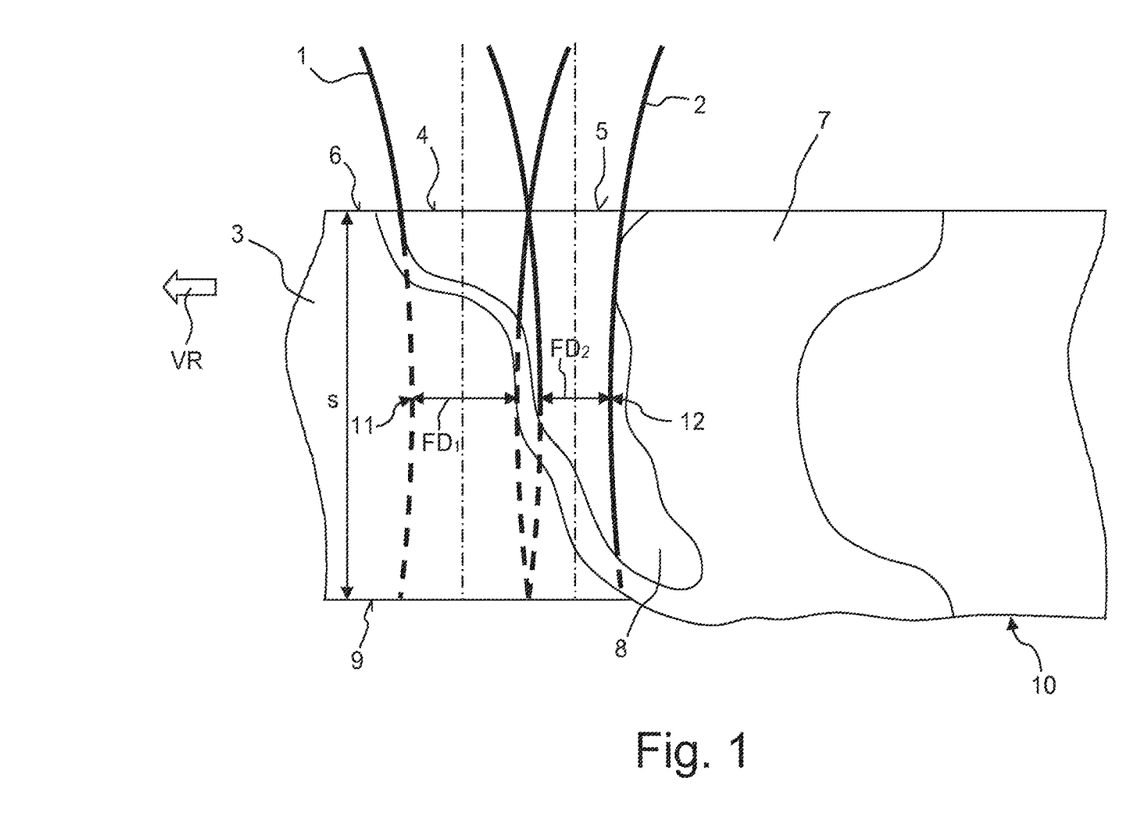
FIG. 1 is a section through a workpiece along the weld seam during a variant of the welding method according to the invention.

FIG. 1 shows, in a sectional view along the feed direction VR of the laser beams 1, 2, a workpiece 3 to be welded during a welding method according to the invention. The workpiece 3 consists of two workpiece portions, a first workpiece portion of which lies above the plane of the drawing and a second workpiece portion of which lies below the plane of the drawing. A contact surface of the workpiece portions to be welded to one another at the butt joint lies in the plane of the drawing in FIG. 1. The workpiece 3 has a workpiece thickness s.

The first laser beam 1 produces a first beam area 4 on the upper side 6 of the workpiece 3, and the second laser beam 2 produces a second beam area 5 on the upper side of the workpiece 3. In the variant shown, the two beam areas 4, 5 just adjoin one another on the upper side 6 (in the projection in FIG. 1), and the laser beams 1, 2 have beam axes that extend perpendicularly to the upper side 6 of the workpiece 3.

The two laser beams 1, 2 generate an extensive weld pool 7 in the workpiece 3 and a vapor capillary (keyhole) 8 within the weld pool 7. In the variant shown, there is a "united" vapor capillary 8 which extends both in the region of the first laser beam 1 and in the region of the second laser beam 2 and also a little beyond same; the power density of each of the laser beams 1, 2 is therefore sufficient to vaporize the workpiece material locally. However, the vapor capillary 8 extends deeper into the workpiece 3 in the region of the second laser beam 2.

The weld pool 7 in this case extends as far as the underside 9 of the workpiece 3, i.e. the workpiece 3 is melted down to and including the underside 9 ("full penetration welding"). In the variant shown, the vapor capillary 8 is completely enclosed at the bottom by the weld bath 7 or melted workpiece material; the vapor capillary 8 is therefore not open at the bottom, and the laser beams 1, 2 do not emerge on an underside 9 of the workpiece 3.

The weld pool 7 is significantly more extensive after the laser beams 1, 2 (i.e. behind the laser beams 1, 2 with respect to the feed direction VR, on the right of the laser beams 1, 2 in FIG. 1) than before the laser beams 1, 2. The weld pool 7 solidifies again behind the weld pool 7, as a result of which a weld seam 10 is formed.

In the variant shown, the laser beams 1, 2 are focused somewhat below the upper side 6 of the workpiece 3, in this case at the same height; cf. the focus positions 11, 12.

According to the invention, the surface area of the first beam area 4 of the leading first laser beam 1 is greater than the surface area of the second beam area 5 of the trailing second laser beam 2. The integrated laser power of the first laser beam 1 is greater than the integrated laser power of the second laser beam 2. The focus diameter $FD_1$ of the first laser beam 1 is larger than the focus diameter $FD_2$ of the second laser beam 2, but the power density (i.e. the power per area) of the first laser beam 1 (measured approximately at the focus position 11) is less than the power density of the second laser beam 2 (measured approximately at the focus position 12).

The area and size ratios of the first beam area 4 and the second beam area 5 for the invention in different variants are illustrated in more detail in FIGS. 2 to 8.

Within the scope of the invention, the leading first laser beam 1 generates an extensive weld pool 7 into which the second laser beam 2 is irradiated. By adhering to the conditions according to the invention, in particular for the dimensions of the beam areas 4, 5 and the input laser power, full penetration welding is achieved with comparatively little energy input into the workpiece 3 or the weld pool 7, and a high seam quality, in particular with little spatter formation, both on the upper side 6 and also on the underside 9 of the workpiece 3 is achieved at a high feed speed; cf. the feed direction VR.

Figure 2:
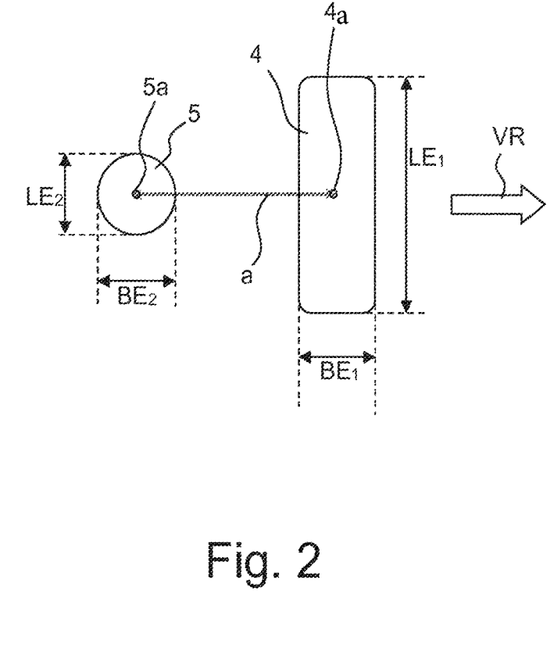
FIG. 2 is a schematic plan view of a first beam area and a second beam area (beam pattern) for the method according to the invention, in a variant with a leading rectangular spot and a trailing circular spot.

FIG. 2 schematically shows a beam pattern comprising a first beam area 4 and a second beam area 5 on the upper side of a workpiece for the laser welding method according to the invention in a variant in which the first beam area 4 is approximately rectangular and the second beam area 5 is approximately circular.

The length $LE_1$ of the first beam area 4 is in this case approximately 2.8 times as large as the length $LE_2$ of the second beam area 5, each measured perpendicularly to the feed direction VR. Accordingly, a weld pool that is significantly further transversely to the feed direction VR than the second beam area 5 can be created by means of the first beam area 4.

In the variant shown, the width $BE_1$ of the first beam area 4 in the feed direction VR is just as large as the width $BE_2$ of the second beam area 5. This ensures that the first laser beam has already acted simultaneously over the width of the workpiece material on which the second laser beam acts simultaneously and corresponding preparatory heat propagation or corresponding preparatory melting took place.

The surface area of the first beam area 4 is in this case approx. 3 times as large as the surface area of the second beam area 5.

The centroid 4a of the first beam area 4 in this case runs ahead of the centroid 5a of the second beam area 5 by the distance a; the beam areas 4, 5 are separate from one another and do not overlap.

With a laser power $P_1$=4500 W of the first laser beam and a laser power $P_2$=3000 W of the second laser beam and at a feed speed v=12 m/min and a workpiece thickness s=2 mm, with the two laser beams focused at the level of the upper side (surface) of the workpiece, a very good seam quality can be achieved in a workpiece 3 made of stainless steel.

For a typical material constant $k_{d,Min}$ of 10 mm²/s for the stainless steel used, a value for $$d_{Min} = \sqrt{\frac{k_{d,Min} \cdot s}{v}}$$

of in this case approx. 0.32 mm is produced for a workpiece thickness of 2 mm and a feed rate of 12 m/min. According to the invention, the focus diameter of the second beam area 5 in the direction transverse to the feed direction VR (this focus diameter in this case corresponding to $LE_2$) should be selected so as to be greater than or equal to $d_{Min}$ (note that the second beam area 5 is circular here, such that the focus diameter of the second beam area 5 is the same in every direction, in particular with $LE_2=BE_2$). In the variant shown, $LE_2$ is approx. 0.35 mm, in accordance with the above condition. In addition, according to the invention, it is recommended that the distance a is chosen to be at least $2^*d_{Min}$. For the variant shown, a was chosen to be approx. 0.8 mm, in accordance with this condition. Finally, according to the invention, it is further recommended that the length $LE_1$ is chosen to be at least $2^*d_{Min}$. In the variant shown, $LE_1$ was selected to be approx. 0.9 mm, in accordance with this condition.

Figure 3:
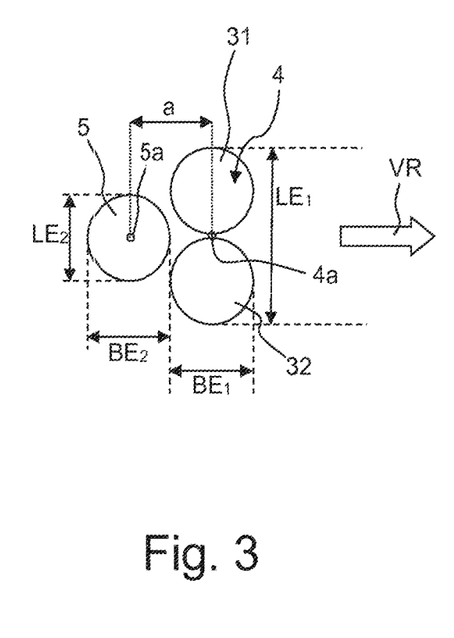
FIG. 3 is a schematic plan view of a first beam area and a second beam area for the method according to the invention, in a variant with a leading spot comprising two circular partial spots and a trailing circular spot.

FIG. 3 schematically illustrates a beam pattern for a variant of the invention in which the first beam area 4 comprises two partial beam areas 31, 32. The partial beam areas 31, 32 are in this case circular and are lined up transversely to the feed direction VR and spaced apart from one another. The length $LE_1$ of the first beam area 4 is determined over the entirety of the partial beam areas 31, 32, i.e. over their opposite outer edges, and is in this case approx. 2.2 times as large as the length $LE_2$ of the second beam area 5. The widths $BE_1$ and $BE_2$ are again the same here. The centroid 4a of the first beam area 4 in this case lies between the partial beam areas 31, 32 at the distance a in front of the centroid 5a of the second beam area 5. The surface area of the first beam area 4 is in this case 2 times as large as the surface area of the second beam area 5.

Figure 4:
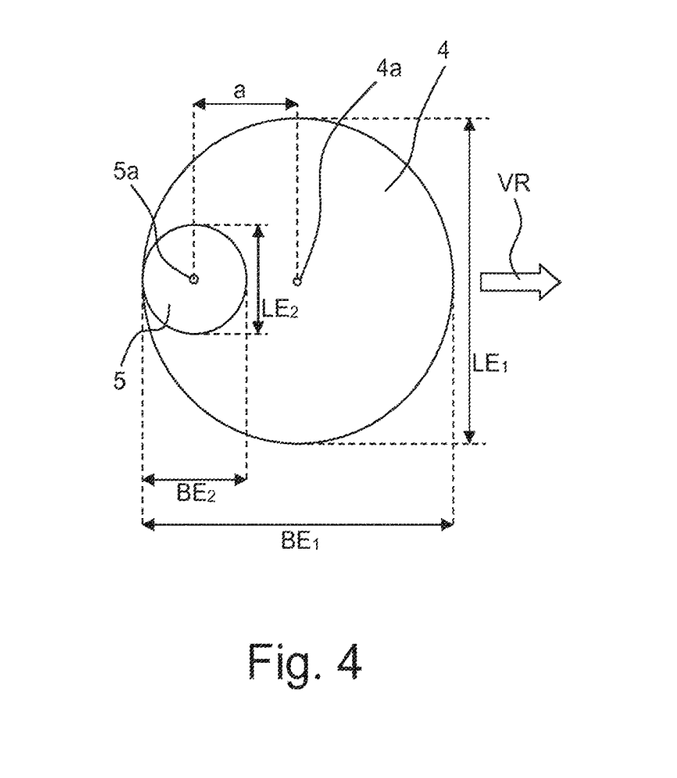
FIG. 4 is a schematic plan view of a first beam area and a second beam area for the method according to the invention, in a variant with a large circular first beam area and a small circular second beam area that lies within the first beam area.

FIG. 4 shows a beam pattern, the first beam area 4 being circular and large, and the second beam area 5 being circular and small in the variant shown, the second beam area 5 being arranged completely within the first beam area 4. In the region of the second beam area 5, the (local) laser power from the two laser beams is combined on the workpiece.

With regard to the feed direction VR, the centroid 4a of the first beam area 4 is ahead of the centroid 5a of the second beam area 5; the distance a is in this case $a=BE_1/2-BE_2/2$. In the variant shown, the width $BE_1$ is approx. 3 times as large as the width $BE_2$; the same also applies to the lengths $LE_1$ and $LE_2$.

Figure 5:
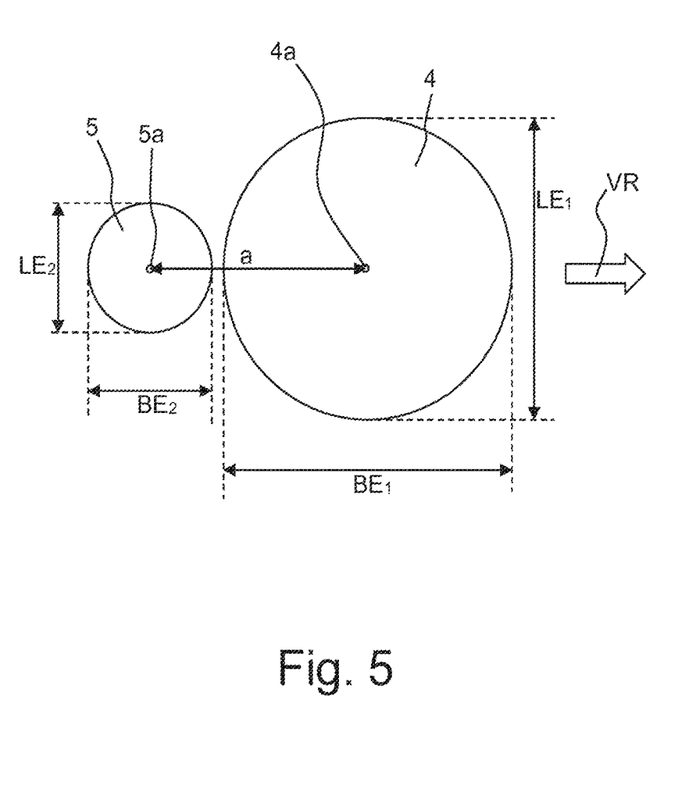
FIG. 5 is a schematic plan view of a first beam area and a second beam area for the method according to the invention, in a variant with a large circular first beam area and a small circular second beam area that is separate from the first beam area.

FIG. 5 shows a beam pattern of a variant in which the first beam area 4 is circular and large, and the second beam area 5 is circular and small, the second beam area 5 being arranged completely outside and (with respect to the feed direction VR) behind the first beam area 4. Accordingly, the distance a between the centroids 4a, 5a is in this case greater than the sum of $BE_1/2$ and $BE_2/2$. The length $LE_1$ is in this case approx. 2.4 times as large as $LE_2$; the same applies to the widths $BE_1$, $BE_2$.

Figure 6:
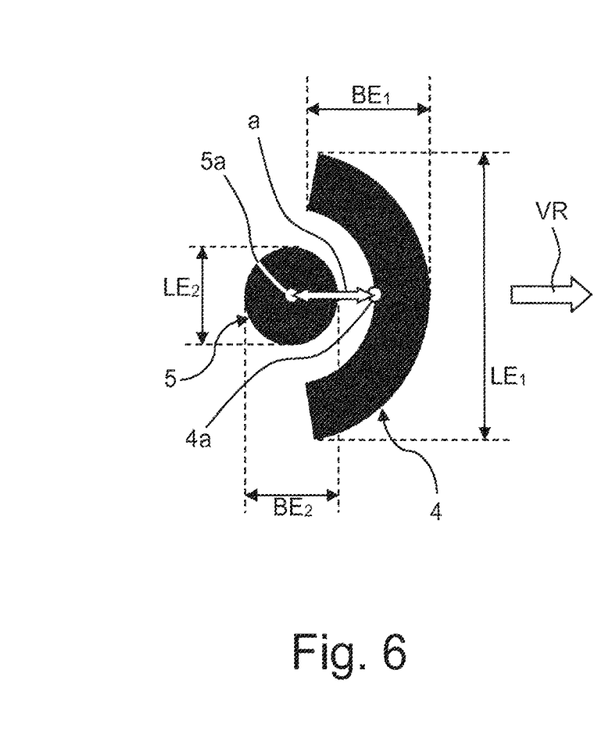
FIG. 6 is a schematic plan view of a first beam area and a second beam area for the method according to the invention, in a variant with a first beam area in the shape of a circular ring segment and a circular second beam area.

FIG. 6 illustrates a beam pattern for a variant in which the first beam area 4 is in the shape of a circular ring segment and the second beam area 5 is circular. In the variant shown, the associated circle centers of the beam areas 4, 5 coincide, namely at the centroid 5a of the second beam area 5; however, the beam areas 4, 5 are separate from one another. The centroid 4a of the first beam area 4 in this case lies approximately on the rear edge of the beam area 4 and in the middle with respect to the direction transverse to the feed direction VR. The width $BE_1$ of the first beam area 4 is in this case approx. 1.33 times as large as the width $BE_2$ of the second beam area 5. The length $LE_1$ of the first beam area 4, on the other hand, is approx. 2.9 times as large as the length $LE_2$ of the second beam area 5. The distance a between the centroids 4a, 5a is in this case approx. 0.9 times as large as the width $BE_2$ of the second beam area 5.

Very uniform heat propagation and also uniform melting toward the region of the second beam area 5 can be achieved on account of the first beam area 4 in the shape of a circular ring segment.

Figure 7:
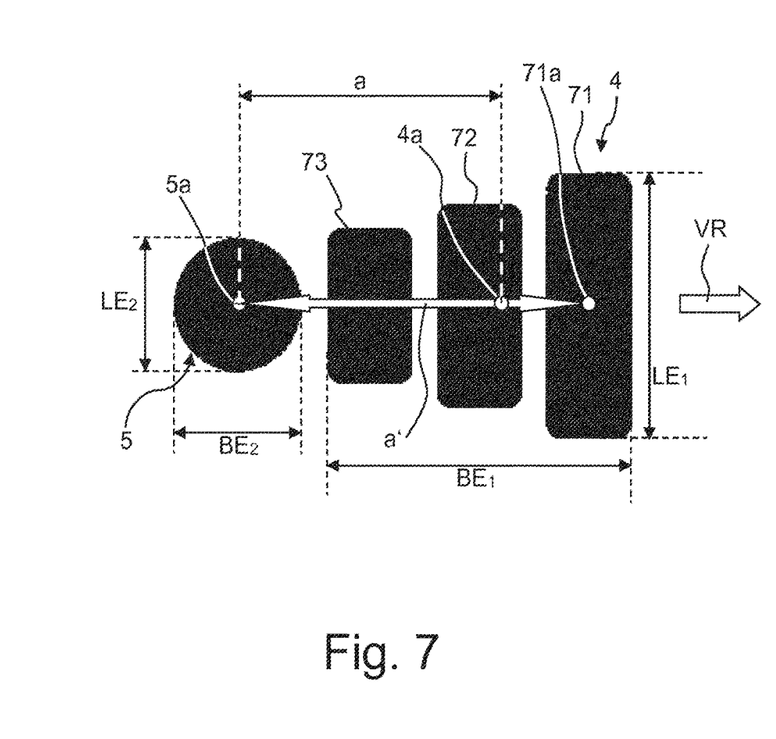
FIG. 7 is a schematic plan view of a first beam area and a second beam area for the method according to the invention, in a variant with a plurality of rectangular partial beam areas of the first beam area and a circular second beam area.

FIG. 7 shows a variant of a beam pattern in which the first beam area 4 comprises three separate partial beam areas 71, 72, 73 which are arranged so as to be lined up one behind the other with respect to the feed direction VR. The partial beam areas 71-73 are each approximately rectangular, the largest partial beam area 71 in the direction transverse to the feed direction VR being arranged furthest forward, and the other partial beam areas 72, 73 having a decreasing length toward the rear (counter to the feed direction VR). The foremost partial beam area 71 determines the length $LE_1$ for the first beam area 4 as a whole. The width $BE_1$ of the first beam area 4 as a whole is determined between the outer edges (with respect to the feed direction VR) of the partial beam areas 73 and 71. In the present case, $LE_1$ is approx. 2 times as large as $LE_2$, and $BE_1$ is approx. 2.4 times as large as $BE_2$.

In the variant shown, all three partial beam areas 71, 72, 73 are used simultaneously in order to introduce a comparatively high laser power into the workpiece over a large area using the first laser beam. For a good seam quality, the distance a' between the centroid 71a of the foremost partial beam area 71 of the first beam area 4 and the centroid 5a of the second beam area 5 should be chosen to be at least $2^*d_{Min}$ (for the definition of $d_{Min}$, see FIG. 1 before). For the smaller distance a between the centroid 4a of the first beam area 4 as a whole (which in this case lies within the second partial beam area 72) and the centroid 5a of the second partial beam area 5, this distance a is also at least $2^*d_{Min}$.

In a preferred embodiment, the number of simultaneously used partial beam areas 71-73 of the first beam area 4 can be changed and/or the partial beam areas 71-73 to be used can be selected, in particular in order to adapt to the workpiece thickness s of the workpiece to be welded depending on the workpiece type. The thicker the workpiece, the further forward in front of the second beam area 5 partial beam areas 71-73 should be used in order to establish correspondingly larger distances a' and a. The thicker the workpiece, the more leading partial beam areas that should be used.

Figure 8:
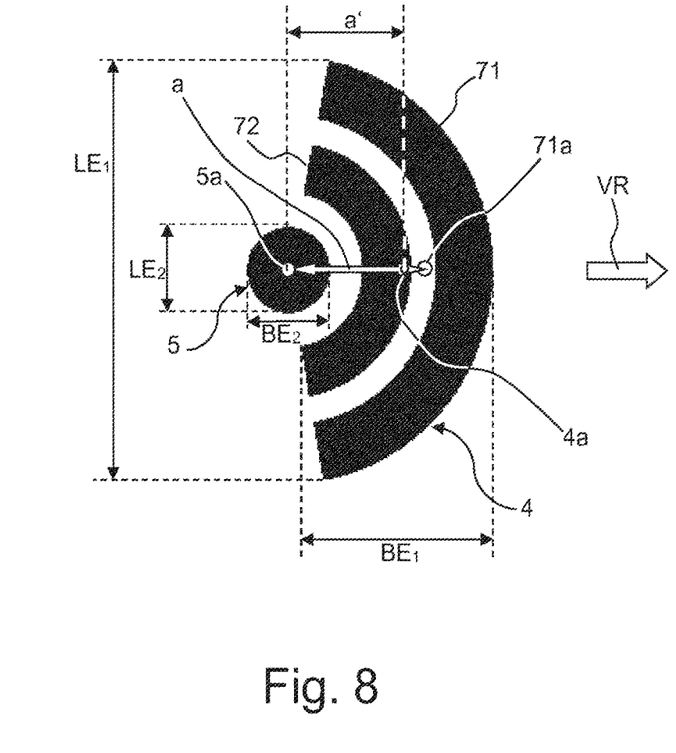
FIG. 8 is a schematic plan view of a first beam area and a second beam area for the method according to the invention, in a variant with a plurality of partial beam areas of the first beam area in the shape of circular ring segments and a circular second beam area.

FIG. 8 shows a beam pattern for a variant in which the first beam area 4 comprises two partial beam areas 71, 72, which in turn are arranged so as to be lined up one behind the other with respect to the feed direction VR. The second beam area 5 is circular.

The partial beam areas 71, 72 are each approximately in the shape of a circular ring segment, the largest partial beam area 71 in the direction transverse to the feed direction VR being arranged furthest forward; the associated circle centers of the partial beam areas 71, 72 and the second beam area 5 coincide at the centroid 5a of the second partial beam area 5. The foremost partial beam area 71 determines the length $LE_1$ for the first beam area 4 as a whole. The width $BE_1$ of the first beam area 4 as a whole is determined between the outer edges (with respect to the feed direction VR) of the partial beam areas 72 and 71. In the present case, $LE_1$ is approx. 4.8 times as large as $LE_2$, and $BE_1$ is approx. 2.3 times as large as $BE_2$.

In this variant, the distance a' (between the centroid 71a of the first partial beam area 71 and the centroid 5a of the second beam area 5) and the distance a (between the centroid 4a of the first beam area 4 as a whole and the centroid 5a of the second beam area 5) do not differ so much, and therefore compliance with both the conditions $a' \geq 2*d_{Min}$ and $a \geq 2*d_{Min}$ at the same time is easier. In this variant, too, the number and choice of the partial beam areas 71, 72 of the first beam area 4 can depend on the type of workpiece, and in particular on the workpiece thickness s.

The method according to the invention can in particular be implemented in systems in which the different beam areas 4, 5 or spots are generated from different laser beams or by splitting a laser beam into two or more partial beams. The same applies to partial beam areas. Advantageous variants are possible, for example, using:
- a double core fiber having two or more parallel adjacent fiber cores of different diameters;
- a double core fiber having a core fiber arranged eccentrically to the surrounding ring fiber;
- a diffractive optical element in the laser machining head that generates the desired intensity profile (beam pattern) and, if necessary, can generate different intensity profiles (beam patterns) in a changeable manner (e.g. when rotating about the optical axis).

For example, by means of rotatable optical elements arranged in the laser machining head, a common rotation of the first and second beam areas or a rotation of the first beam area (or the partial beam areas thereof) about the second beam area can take place. This makes it possible to adapt the alignment of the beam areas to a curved (non-linear) welding joint.

By means of the method according to the invention, in particular tubes, profiles and tailored welded blanks can be manufactured without subsequent machining work. There is no or hardly any spattering, and this reduces system downtimes. The eccentric approach (with the centroids of the first beam area and the second beam area shifted relative to one another in the feed direction) reduces the energy required for laser welding, and there is also the possibility of increasing productivity (via a higher feed speed).

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

1 First laser beam
2 Second laser beam
3 Workpiece
4 First beam area
4a Centroid of the first beam area
5 Second beam area
5a Centroid of the second beam area
6 Upper side of the workpiece
7 Weld pool
8 Vapor capillary
9 Underside of the workpiece
10 Weld seam
11 Focus position of the first laser beam
12 Focus position of the second laser beam
31 Partial beam area of the first beam area
32 Partial beam area of the first beam area
71 Foremost partial beam area of the first beam area
71a Centroid of the foremost partial beam area
72 Partial beam area of the first beam area
73 Partial beam area of the first beam area
a Distance between the centroid of the first beam area and second beam area
a' Distance between the centroid of the foremost partial beam area of the first
beam area and second beam area
$BE_1$ Width of the first beam area
$BE_2$ Width of the second beam area
$FD_1$ Focus diameter of the first laser beam
$FD_2$ Focus diameter of the second laser beam
$LE_1$ Length of the first beam area
$LE_2$ Length of the second beam area
VR Feed direction

The invention claimed is:

1. A method for laser beam welding a workpiece, the method comprising:
generating at least a first beam area on the workpiece by a first laser beam; and
generating a second beam area on the workpiece by a second laser beam,
wherein the first beam area and the second beam area are guided in a feed direction relative to the workpiece, wherein a centroid of the first beam area and a centroid of the second beam area are not coinciding, wherein the first beam area runs ahead of the second beam area, wherein a length (LE$_1$) of the first beam area, measured transversely to the feed direction, is greater than or equal to a length (LE$_2$) of the second beam area, a surface area of the first beam area is greater than a surface area of the second beam area, wherein a width (BE$_1$) of the first beam area, measured in the feed direction, is greater than or equal to a width (BE$_2$) of the second beam area, wherein a laser power of the first laser beam is greater than a laser power of the second laser beam, wherein the second laser beam is irradiated into a weld pool generated by the first laser beam, and wherein a focus diameter (FD$_2$) of the second laser beam satisfies, at least in one direction transverse to the feed direction:

$$FD_2 \geq d_{Min}, \text{ with } d_{Min} = \sqrt{\frac{k_{d,Min} \cdot s}{v}},$$

with k$_{d,Min}$: a material-specific constant, with s: a workpiece thickness to be welded, and with v: a feed speed for the laser beam welding, wherein the workpiece comprises stainless steel or structural steel, and wherein the material-specific constant k$_{d,Min}$ is between 5 and 20 mm$^2$/s for stainless steel, and is between 8 and 20 mm$^2$/s for structural steel.

2. The method according to claim 1, wherein the first laser beam and the second laser beam are generated using one or more solid-state lasers.

3. The method according to claim 1, wherein a focus diameter (FD$_2$) of the second laser beam is smaller than a focus diameter (FD$_1$) of the first laser beam, and a power density of the second laser beam is greater than a power density of the first laser beam.

4. The method according to claim 1, wherein the length (LE$_1$) of the first beam area satisfies:

$$LE_1 \geq b_{Min}, \text{ with } b_{Min} = 2 * d_{Min}.$$

5. The method according to claim 1, wherein a distance between the centroid of the first beam area and the centroid of the second beam area in the feed direction satisfies:

$$a \geq a_{Min}, \text{ with } a_{Min} = 2 * d_{Min}.$$

6. The method according to claim 1, the method comprising laser beam welding a plurality of workpieces of different workpiece thicknesses, the workpieces comprising the workpiece, wherein a distance a between the centroid of the first beam area and the centroid of the second beam area in the feed direction is selected so as to be greater for workpieces having a greater workpiece thickness.

7. The method according to claim 1, wherein the first beam area and the second beam area overlap.

8. The method according to claim 1, wherein the first beam area and the second beam area are separated from one another.

9. The method according to claim 1, wherein the first beam area comprises at least two partial beam areas lined up in a direction transverse to the feed direction and separated from one another.

10. The method according to claim 1, wherein the first beam area comprises at least two partial beam areas lined up in the feed direction and separated from one another.

11. The method according to claim 1, wherein the first beam area comprises at least two partial beam areas lined up in the feed direction and separated from one another, and wherein, a distance a' between a centroid of a foremost partial beam area of the first beam area and the centroid of the second beam area in the feed direction satisfies:

$$a \geq a_{Min}, \text{ with } a_{Min} = 2 * d_{Min}.$$

12. The method according to claim 10, the method comprising laser beam welding a plurality of workpieces of different workpiece thicknesses, the workpieces comprising the workpiece, wherein a number of partial beam areas lined up in the feed direction is selected so as to be larger with a larger workpiece thickness.

13. The method according to claim 10, wherein the partial beam areas lined up in the feed direction have a length, measured transversely to the feed direction, that decreases toward the second beam area.

14. The method according to claim 1, wherein the laser beam welding is implemented as full penetration welding.

15. The method according to claim 9, wherein the partial beam areas are circular.

16. The method according to claim 10, wherein the partial beam areas are in a shape of a rectangle or a circular ring segment.

17. The method for laser beam welding a workpiece, the method comprising:

generating at least a first beam area on the workpiece by a first laser beam; and generating a second beam area on the workpiece by a second laser beam, wherein the first beam area and the second beam area are guided in a feed direction relative to the workpiece, wherein a centroid of the first beam area and a centroid of the second beam area are not coinciding, wherein the first beam area runs ahead of the second beam area, wherein a length (LE$^1$) of the first beam area, measured transversely to the feed direction, is greater than or equal to a length (LE$_2$) of the second beam area, a surface area of the first beam area is greater than a surface area of the second beam area, wherein a width (BE$_1$) of the first beam area, measured in the feed direction, is greater than or equal to a width (BE$_2$) of the second beam area, wherein a laser power of the first laser beam is greater than a laser power of the second laser beam, wherein the second laser beam is irradiated into a weld pool generated by the first laser beam, and wherein a distance between the centroid of the first beam area and the centroid of the second beam area in the feed direction satisfies:

$$a \geq a_{Min}, \text{ with } a_{Min} = 2 * d_{Min}, \text{ with}$$

$$d_{Min} = \sqrt{\frac{k_{d,Min} \cdot s}{v}},$$

with $k_{d,Min}$: a material-specific constant that is between 3 and 30 mm²/s, with s: a workpiece thickness to be welded, and with v: a feed speed for the laser beam welding.

\* \* \* \* \*